(12) United States Patent
Sunayama et al.

(10) Patent No.: US 8,211,992 B2
(45) Date of Patent: Jul. 3, 2012

(54) CURABLE COMPOSITION

(75) Inventors: Yoshitaka Sunayama, Tokyo (JP); Genichirou Enna, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 12/841,201

(22) Filed: Jul. 22, 2010

(65) Prior Publication Data

US 2010/0286344 A1 Nov. 11, 2010

Related U.S. Application Data

(63) Continuation of application No. PCT/JP2009/052933, filed on Feb. 19, 2009.

(30) Foreign Application Priority Data

Feb. 22, 2008 (JP) ................. 2008-041184

(51) Int. Cl.
C08G 77/08 (2006.01)
(52) U.S. Cl. ....................................... 528/21
(58) Field of Classification Search .............. 528/21
See application file for complete search history.

(56) References Cited

U.S. PATENT DOCUMENTS

| | | | | |
|---|---|---|---|---|
| 4,144,221 A | * | 3/1979 | Ikeda et al. | 524/720 |
| 4,477,625 A | * | 10/1984 | Lockhart | 524/789 |
| 4,837,274 A | * | 6/1989 | Kawakubo et al. | 525/100 |
| 4,904,732 A | * | 2/1990 | Iwahara et al. | 525/100 |
| 5,712,340 A | * | 1/1998 | Gyotoku et al. | 524/521 |
| 2006/0135709 A1 | * | 6/2006 | Hasegawa et al. | 525/474 |
| 2008/0161491 A1 | * | 7/2008 | Pawlow et al. | 524/856 |
| 2009/0163662 A1 | | 6/2009 | Yasuda et al. | |
| 2009/0182099 A1 | * | 7/2009 | Noro et al. | 525/474 |

FOREIGN PATENT DOCUMENTS

| | | |
|---|---|---|
| JP | 63-112642 | 5/1988 |
| JP | 2004-091771 | 3/2004 |
| JP | 2007-302774 | 11/2007 |
| WO | 2007/094273 * | 8/2007 |

* cited by examiner

*Primary Examiner* — Margaret Moore
(74) *Attorney, Agent, or Firm* — Oblon, Spivak, McClelland, Maier & Neustadt, L.L.P.

(57) ABSTRACT

To provide a curable composition comprising a polymer having a reactive silicon group as a curing component, containing no or substantially no organic metal compound, and having a high curing rate. A curable composition comprising a polymer (A) having a reactive silicon group as a curing component and comprising an amidine derivative salt (B) represented by the following formula (2) as a curing catalyst:

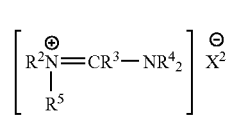

(2)

wherein $R^2$ is a hydrocarbon group or a hydrogen atom, each of $R^3$ and two $R^4$'s which are independent of one another, is an organic group or a hydrogen atom, $R^5$ is a $C_{1\text{-}25}$ hydrocarbon group or a hydrogen atom, and $X^2$ is an organic acid ion, an inorganic acid ion or a hydroxy group, and optional two or more of $R^2$, $R^3$ and two $R^4$'s may be bonded to form a cyclic structure.

9 Claims, No Drawings

CURABLE COMPOSITION

TECHNICAL FIELD

The present invention relates to a curable composition.

BACKGROUND ART

Heretofore, a polymer having at least one silicon atom-containing group containing a silicon atom to which a hydroxy group or a hydrolyzable group is bonded, and capable of crosslinking by forming a siloxane bond, has been known.

As a curing catalyst for curing such a polymer, various ones have been known, and for example, Patent Document 1 discloses use of an organic metal compound such as dibutyltin dilaurate, tin octanoate or lead octanoate.

Further, Patent Document 2 discloses use of an amidine compound represented by $R^1N$=$CR^2$—$NR^3{}_2$, having a melting point of less than 23° C. and having a molecular weight of at least 160, as a silanol condensation catalyst for curing an organic polymer having a reactive silicon group.

Patent Document 1: JP-A-63-112642
Patent Document 2: JP-A-2007-302774

DISCLOSURE OF THE INVENTION

Problem to be Solved by the Invention

However, an organic metal compound containing tin, lead or the like is expensive. Further, in recent years, strict control is required over discharge and disposal of a lead compound or the like from the viewpoint of accumulation in and harmfulness to the body, and accordingly it is desired not to use an organic metal compound such as a lead compound as far as possible.

Further, the amidine compound disclosed as the silanol condensation catalyst in Patent Document 2 does not form a salt, and if such an amidine compound is used as the curing catalyst, the curing rate of a polymer is low in some cases, and particularly curing at the time of rise tends to be slow. Further, if the amidine compound is used as the curing catalyst, a cured product undergoes discoloration with time in some cases.

The present invention has been made under the above circumstances, and its object is to provide a curable composition containing a polymer having a reactive silicon group as a curing component, containing no or substantially no organic metal compound, and having a high curing rate.

Means to Solve the Problem

To solve the above problem, the curable composition of the present invention comprises a polymer (A) having a reactive silicon group represented by the following formula (1) and an amidine derivative salt (B) represented by the following formula (2):

$$—SiX^1{}_aR^1{}_{3-a} \quad (1)$$

wherein $R^1$ is a $C_{1-20}$ monovalent organic group (excluding a hydrolyzable group) which may have a substituent, $X^1$ is a hydroxy group or a hydrolyzable group, and "a" is an integer of from 1 to 3, provided that when there are a plurality of $R^1$'s, the plurality of $R^1$'s may be the same or different, and when there are a plurality of $X^1$'s, the plurality of $X^1$'s may be the same or different,

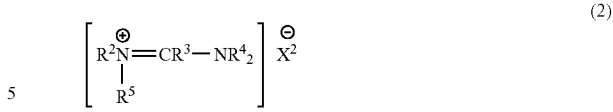

wherein $R^2$ is a hydrocarbon group in which the carbon atom at the α-position to the nitrogen atom is a carbon atom having no unsaturated bond, or a hydrogen atom, each of $R^3$ and two $R^4$'s which are independent of one another, is an organic group or a hydrogen atom, $R^5$ is a $C_{1-25}$ linear or branched saturated or unsaturated hydrocarbon group or a hydrogen atom, and $X^2$ is an organic acid ion, an inorganic acid ion or a hydroxy group, and optional two or more of $R^2$, $R^3$ and two $R^4$'s may be bonded to form a cyclic structure.

The polymer (A) has a reactive silicon group represented by the formula (1) and may have a urethane bond in its molecule.

The polymer (A) may be a polymer obtained by subjecting a polymer (pP) having a polyoxyalkylene chain and a hydroxy group to urethane-forming reaction with an isocyanate compound (U) having a group represented by the following formula (3) and an isocyanate group, the ratio (isocyanate groups/hydroxy groups) of the total number of the isocyanate groups of the isocyanate compound (U) to the total number of the hydroxy groups of the polymer (pP) in the urethane-forming reaction being from 0.80 to 1.10:

$$—SiX^1{}_aR^1{}_{3-a} \quad (3)$$

wherein $R^1$ is a $C_{1-20}$ monovalent organic group (excluding a hydrolyzable group) which may have a substituent, $X^1$ is a hydroxy group or a hydrolyzable group, and "a" is an integer of from 1 to 3, provided that when there are a plurality of $R^1$'s, the plurality of $R^1$'s may be the same or different, and when there are a plurality of $X^1$'s, the plurality of $X^1$'s may be the same or different.

It preferably contains 100 parts by mass of the polymer (A) and from 0.1 to 10 parts by mass of the amidine derivative salt (B).

It may further contain an acrylic polymer (C) having a reactive silicon group represented by the following formula (4) and having alkyl (meth)acrylate monomer units:

$$—SiX^{41}{}_bR^{41}{}_{3-b} \quad (4)$$

wherein $R^{41}$ is a $C_{1-20}$ monovalent organic group (excluding a hydrolyzable group) which may have a substituent, $X^{41}$ is a hydroxy group or a hydrolyzable group, and b is an integer of from 1 to 3, provided that when there are a plurality of $R^{41}$'s, the plurality of $R^1$'s may be the same or different, and when there are a plurality of $X^{41}$'s, the plurality of $X^{41}$'s may be the same or different.

In a case where it contains the acrylic polymer (C), it preferably contains from 0.1 to 10 parts by mass of the amidine derivative salt (B) per 100 parts by mass of the total amount of the polymer (A) and the acrylic polymer (C).

The polymer (A) having a reactive silicon group may have a number average molecular weight of from 2,000 to 50,000.

EFFECTS OF THE INVENTION

According to the present invention, a curable composition containing a polymer having a reactive silicon group as a curing component, containing no or substantially no organic metal compound and having a high curing rate can be obtained.

BEST MODE FOR CARRYING OUT THE INVENTION

<Polymer (A)>

The polymer (A) (hereinafter sometimes referred to as a component (A)) to be used in the present invention is a polymer having a polyoxyalkylene chain. As specific examples of a preferred polyoxyalkylene chain, a polyoxyethylene chain, a polyoxypropylene chain, a polyoxybutylene chain, a polyoxyhexylene chain, a polyoxytetramethylene chain and "a molecular chain comprising a copolymer of two or more cyclic ethers" may be mentioned. The main chain of the polymer (A) may be a molecular chain comprising one of them, or may be a molecular chain comprising a combination of them. The polymer (A) is particularly preferably one comprising substantially only a polyoxypropylene chain as the main chain.

The polymer (A) has a reactive silicon group represented by the above formula (1) as a substituent in its side chains or at its terminal. It more preferably has the reactive silicon group as a substituent at its terminal. The reactive silicon group may be directly bonded to the polyoxyalkylene chain, or may be bonded via another organic group. In the formula (1), "a" is an integer of from 1 to 3.

In the formula (1), $R^1$ is a $C_{1-20}$ monovalent organic group which may have a substituent. $R^1$ does not include a hydrolyzable group as described hereinafter.

$R^1$ is preferably an alkyl group having at most 8 carbon atoms, more preferably a methyl group. When a plurality of $R^1$'s are present in one molecule, such a plurality of $R^1$'s may be the same or different.

In the formula (1), $X^1$ is a hydroxy group or a hydrolyzable group. The hydrolyzable group here means a substituent which is directly bonded to the silicon atom, and which can form a siloxane bond by hydrolysis reaction and/or condensation reaction. Such a hydrolyzable group may, for example, be a halogen atom, an alkoxy group, an acyloxy group or an alkenyloxy group. When the hydrolyzable group has a carbon atom, it preferably has at most 6, more preferably at most 4 carbon atoms. $X^1$ is particularly preferably an alkoxy group having at most 4 carbon atoms or an alkenyloxy group having at most 4 carbon atoms. More specifically, $X^1$ is particularly preferably a methoxy group or an ethoxy group. When a plurality of $X^1$'s are present in one molecule, such a plurality of $X^1$'s may be the same or different.

The reactive silicon group represented by the formula (1) is preferably bonded to the polyoxyalkylene chain by means of a bivalent organic group. In such a case, the polymer (A) has a group represented by the following formula (5):

$$-R^0-SiX^1_aR^1_{3-a} \quad (5)$$

In the formula (5), $R^1$, $X^1$ and "a", and their preferred embodiments, are as defined for the formula (1). Further, $R^0$ is a bivalent organic group. $R^0$ is preferably a $C_{1-10}$ alkylene group which may have an ether bond, a urethane bond, an ester bond or a carbonate bond.

In the polymer (A), in the reactive silicon group represented by the formula (1), one, two or three $X^1$'s are bonded to the silicon atom.

When two or more $X^1$'s are bonded to the silicon atom, such $X^1$'s may be the same or different. Further, when the polymer (A) has a plurality of the reactive silicon groups of the formula (1), all such groups may be the same, or two or more different groups may be contained.

The polymer (A) preferably has from 1 to 8, more preferably from 1.1 to 5, most preferably from 1.1 to 3 reactive silicon groups represented by the formula (1) per one molecule of the polymer. When the number of the reactive silicon groups is at most 8, a cured product obtained by curing the curable composition will have favorable elongation. Further, by the polymer (A) having at least 1 reactive silicon group, sufficient hardness and curing properties will be obtained.

The polymer (A) can be produced, for example, by introducing a reactive silicon group to a polyoxyalkylene chain-containing polymer (P) comprising a polyoxyalkylene chain as the main chain and having a hydroxy group, an unsaturated group or the like as a functional group to introduce the reactive silicon group.

In the polyoxyalkylene chain-containing polymer (P), the number of the functional group to introduce the reactive silicon group is preferably from 1 to 8, more preferably from 1.1 to 5, most preferably from 1.1 to 3 per one molecule of the polymer (P). When the number of the reactive silicon group is at most 8, a cured product obtained by curing the curable composition will have favorable elongation. Further, by the polymer (A) having at least one reactive silicon group, sufficient hardness and curing properties will be obtained.

Among such polyoxyalkylene chain-containing polymers (P), a polyoxyalkylene chain-containing polymer (pP) having a hydroxy group can be obtained, for example, by subjecting a cyclic ether compound to ring-opening polymerization in the presence of a catalyst and an initiator. As the initiator in such a case, a hydroxy compound having at least one hydroxy group or the like may be used. The cyclic ether compound may, for example, be ethylene oxide, propylene oxide, butylene oxide, hexylene oxide or tetrahydrofuran. The catalyst may, for example, be an alkali metal catalyst such as a potassium compound or a cesium compound, a double metal cyanide complex catalyst, a metal porphyrin catalyst or a catalyst of a compound type having a P=N bond such as a phosphazene compound.

The double metal cyanide complex is preferably a complex comprising zinc hexacyanocobaltate as the main component, particularly preferably an ether and/or alcohol complex. In such a case, the ether is preferably ethylene glycol dimethyl ether (glyme), diethylene glycol dimethyl ether (diglyme) or the like, and in view of handling efficiency at the time of production of the catalyst, particularly preferably glyme. The alcohol is preferably t-butanol.

The polyoxyalkylene chain-containing polymer (pP) having a hydroxy group preferably has a relatively high molecular weight. Specifically, the number average molecular weight (Mn) of the polyoxyalkylene chain-containing polymer (pP) is preferably from 2,000 to 50,000, particularly preferably from 4,000 to 30,000.

As a method of introducing the reactive silicon group represented by the above formula (1) to the polyoxyalkylene chain-containing polymer (P) as a starting material, the following method (a), (b), (c), (d), (e) or (f) is preferred.

Further, preferred is the method (b), (c), (d) or (e) since excellent adhesive properties and quick curing properties are obtained when there is a urethane bond in the molecule, and particularly preferred is the method (b) with which an increase in the viscosity at the time of preparation can be suppressed, and excellent workability is obtained.

"The polyoxyalkylene chain-containing polymer (pP)" to be used in the following method is particularly preferably a polyoxypropylene polyol having from 2 to 6 hydroxy groups. Further, among the polyoxypropylene polyols, preferred is polyoxypropylene diol or polyoxypropylene triol.

(a) A method of reacting a hydrosilyl compound represented by the following formula (6) with a polyoxyalkylene chain-containing polymer having an unsaturated group:

$$HSiX^1_aR^1_{3-a} \quad (6)$$

In the formula (6), $R^1$, $X^1$ and "a", and their preferred embodiments, are as defined for the formula (1).

The polyoxyalkylene chain-containing polymer having an unsaturated group is obtained, for example, by a method of reacting a compound having a functional group reactive with a hydroxy group, and an unsaturated group, with the polyoxyalkylene chain-containing polymer (pP) having a hydroxy group. In such a case, the unsaturated group is bonded to the polyoxyalkylene chain by means of an ether bond, an ester bond, a urethane bond, a carbonate bond or the like. Otherwise, when the alkylene oxide is polymerized, an unsaturated group-containing epoxy compound such as allyl glycidyl ether is copolymerized to obtain a polyoxyalkylene chain-containing polymer having an unsaturated group in its side chain.

Further, as the polyoxyalkylene chain-containing polymer having an unsaturated group, a polyoxyalkylene having an unsaturated group, such as an allyl-terminal polyoxypropylene monool may suitably be used.

The reaction of the polyoxyalkylene chain-containing polymer having an unsaturated group with a hydrosilyl compound is carried out preferably in the presence of a catalyst such as a platinum catalyst, a rhodium catalyst, a cobalt catalyst, a palladium catalyst or a nickel catalyst. Among them, preferred is a platinum catalyst such as chloroplatinate, metal platinum, platinum chloride or a platinum-olefin catalyst. Further, the reaction is carried out preferably at from 30 to 150° C., preferably from 60 to 120° C. for several hours.

(b) A method of subjecting the polyoxyalkylene chain-containing polymer (pP) having a hydroxy group to urethane-forming reaction with an isocyanate compound (U) having a group represented by the following formula (3) and an isocyanate group:

$$—SiX^1{}_aR^1{}_{3-a} \quad (3)$$

wherein $R^1$ is a $C_{1-20}$ monovalent organic group (excluding a hydrolyzable group) which may have a substituent, $X^1$ is a hydroxy group or a hydrolyzable group, and "a" is an integer of from 1 to 3, provided that when there are a plurality of $R^1$'s, the plurality of $R^1$'s may be the same or different, and when there are a plurality of $X^1$'s, the plurality of $X^1$'s may be the same or different.

The isocyanate compound (U) is preferably a compound represented by the following formula (3-1):

$$OCN—R^6—SiX^1{}_aR^1{}_{3-a} \quad (3\text{-}1)$$

In the formulae (3) and (3-1), $R^1$, $X^1$ and "a", and their preferred embodiments, are as defined for the formula (1). Further, $R^6$ is a $C_{1-17}$ bivalent hydrocarbon group. The isocyanate compound represented by the formula (3-1) may, for example, be 1-isocyanate methyltrimethoxysilane, 1-isocyanate methyltriethoxysilane, 1-isocyanate methylmethyldimethoxysilane, 3-isocyanate propyltrimethoxysilane or 3-isocyanate propyltriethoxysilane.

Particularly preferred is 3-isocyanate propyltrimethoxysilane or 1-isocyanate methylmethyldimethoxysilane in view of excellent quick curing properties.

At the time of the urethane-forming reaction of the polyoxyalkylene chain-containing polymer (pP) having a hydroxy group and the isocyanate compound (U), a known urethane-forming catalyst may be used. Further, this reaction is preferably carried out at from 20 to 200° C., preferably from 50 to 150° C. for several hours.

By this method, the procedure time can be remarkably shortened since the number of production steps is small, no impurity will be formed as a by-product during the production process, and complicated operation such as purification is unnecessary.

In the urethane-forming reaction of the polymer (pP) and the isocyanate compound (U), the reaction is preferably carried out so that the ratio (isocyanate groups/hydroxy groups) of the total number of the isocyanate groups (NCO) of the isocyanate compound (U) to the total number of the hydroxy groups (OH) of the polymer (pP) as a starting material is such that NCO/OH=0.80 to 1.10 by the molar ratio. The NCO/OH (molar ratio) is more preferably from 0.85 to 1.00.

When the NCO/OH ratio is at least the lower limit of the above range, favorable storage stability will be obtained. Accordingly, if the NCO ratio is less than the above range, it is preferred to consume excess OH groups by newly reacting an isocyanate silane compound (U) or a monoisocyanate compound. When the NCO/OH ratio is at most the upper limit of the above range, it is considered that the side reaction (such as an allophanate-forming reaction or an isocyanurate-forming reaction) in the urethane-forming reaction is suppressed, and the viscosity of the curable composition tends to hardly increase.

(c) A method of reacting the polyoxyalkylene chain-containing polymer (pP) having a hydroxy group with a polyisocyanate compound such as tolylene diisocyanate to obtain a prepolymer (iP) having an isocyanate group at its terminal, and reacting the prepolymer (iP) with a silicon compound having an active hydrogen group in its molecule and having a reactive silicon group.

By this method, a polymer (A) having a reactive silicon group bonded at the terminal of the polyoxyalkylene chain-containing polymer (pP) by means of a connecting group having a urethane bond, can be obtained.

In the urethane-forming reaction of the polyoxyalkylene chain-containing polymer (pP) and the polyisocyanate compound, the ratio (isocyanate groups/hydroxy groups) of the total number of the isocyanate groups (NCO) of the polyisocyanate compound to the total number of the hydroxy groups (OH) of the polyoxyalkylene chain-containing polymer (pP) is preferably such that NCO/OH=1.5 to 2.5 by the molar ratio. The NCO/OH (molar ratio) is more preferably from 1.7 to 2.0.

When the NCO/OH ratio is at least the lower limit of the above range, favorable storage stability will be obtained, and when it is at most the upper limit of the above range, it is considered that the side reaction in the urethane-forming reaction is suppressed, and the viscosity of the curable composition tends to hardly increase.

As the silicon compound to be used in this method, for example, a compound represented by the following formula (7) may be used:

$$W—R^7—SiX^1{}_aR^1{}_{3-a} \quad (7)$$

In the formula (7), $R^1$, $X^1$ and "a", and their preferred embodiments, are as defined for the formula (1). Further, $R^7$ is a $C_{1-17}$ bivalent hydrocarbon group, and W is a substituent having active hydrogen. As specific examples of a preferred W, a hydroxy group, a carboxy group, a mercapto group and a primary or secondary amino group may be mentioned. In this method, by the reaction of the isocyanate group at the terminal of the prepolymer (iP) with the substituent W having active hydrogen, the reactive silicon group is introduced.

As specific examples of the silicon compound represented by the formula (7), a reaction product of N-2(aminoethyl)-3-aminopropylmethyldimethoxysilane with 2-ethylhexyl acrylate or N-phenyl-3-aminopropyltrimethoxysilane may be mentioned.

The silicon compound to be used in this method may also be produced by reacting a first compound (such as N-2(aminoethyl)3-aminopropylmethyldimethoxysilane) having an organic group (I) containing at least one group selected from the group consisting of a primary amino group, a secondary amino group, an acryloyl group, a hydroxy group, an epoxy group and a mercapto group, and a reactive silicon group, with a second organic group (such as 2-ethylhexyl acrylate) capable of forming a compound having a secondary amino group or a hydroxy group by the reaction with the organic group (I).

(d) A method of reacting a prepolymer (uP) having a polyoxyalkylene chain and a urethane bond and having an unsaturated group at its terminal with a hydrosilyl compound represented by the following formula (8).

By this method, a polymer (A) having a reactive silicon group bonded to a monovalent group derived from the above unsaturated group at the terminal of the prepolymer (uP) having a urethane bond is obtained:

$$HSiX^1_a R^1_{3-a} \qquad (8)$$

In the formula (8), $R^1$, $X^1$ and "a", and their preferred embodiments, are as defined for the formula (1).

The prepolymer (uP) is obtained, for example, by a method of reacting the polyoxyalkylene chain-containing polymer (pP) having a hydroxy group with a compound having an isocyanate group and an unsaturated group. By this reaction, by the reaction of the hydroxy group of the polyoxyalkylene chain-containing polymer (pP) with the isocyanate group, the urethane bond is formed.

The reaction of the prepolymer (uP) with the hydrosilyl compound is carried out preferably in the presence of a catalyst such as a platinum catalyst, a rhodium catalyst, a cobalt catalyst, a palladium catalyst or a nickel catalyst. Among them, preferred is a platinum catalyst such as chloroplatinate, metal platinum, platinum chloride or a platinum-olefin complex. Further, this reaction is preferably carried out at from 30 to 150° C., preferably from 60 to 120° C. for several hours.

(e) A method of reacting the above prepolymer (uP) with a mercapto compound represented by the following formula (9).

By this method, a polymer (A) having a reactive silicon group bonded to a monovalent group derived from the above unsaturated group by means of a connecting group (—S—$R^4$—) derived from the mercapto compound at the terminal of the prepolymer (uP) having a urethane bond, is obtained:

$$HS—R^8—SiX^1_a R^1_{3-a} \qquad (9)$$

In the formula (9), $R^1$, $X^1$ and "a" and their preferred embodiments, are as defined for the formula (1). $R^8$ is a $C_{1-17}$ bivalent hydrocarbon group. The mercapto compound represented by the formula (9) may, for example, be 3-mercaptopropyltrimethoxysilane or 3-mercaptopropyltriethoxysilane.

The reaction of the prepolymer (uP) with the mercapto compound is suitably carried out in the presence of a polymerization initiator such as a radical generator. Otherwise, instead of the use of the polymerization initiator, the reaction may be conducted by radiation or heat. The polymerization initiator may, for example, be a polymerization initiator of e.g. peroxide, azo or redox type, or a metal compound catalyst. As specific examples of a preferred polymerization initiator, 2,2'-azobisisobutylonitrile, 2,2'-azobis-2-methylbutylonitrile, benzoyl peroxide, t-alkyl peroxy ester, acetyl peroxide and diisopropyl peroxycarbonate may be mentioned. Further, the above reaction is preferably carried out at from 20 to 200° C., preferably from 50 to 150° C. for from several hours to several tens hours.

(f) A method of reacting the polyoxyalkylene chain-containing polymer having an unsaturated group with a mercapto compound represented by the following formula (10):

$$HS—R^9—SiX^1_a R^1_{3-a} \qquad (10)$$

In the formula (10), $R^1$, $X^1$ and "a", and their preferred embodiments, are as defined for the formula (1). $R^9$ is a $C_{1-17}$ bivalent hydrocarbon group. The mercapto compound represented by the formula (10) may, for example, be 3-mercaptopropyltrimethoxysilane or 3-mercaptopropyltriethoxysilane.

As the polyoxyalkylene chain-containing polymer having an unsaturated group, the same one as in the above method (a) may be used.

The reaction of the polyoxyalkylene chain-containing polymer having an unsaturated group with the above mercapto compound may be preferably carried out in the presence of a polymerization initiator such as a radical generator. Otherwise, instead of use of the polymerization initiator, the reaction may be conducted by radiation or heat. The polymerization initiator may, for example, be a polymerization initiator of e.g. peroxide, azo or redox type, or a metal compound catalyst. As specific examples of a preferred polymerization initiator, 2,2'-azobisisobutylonitrile, 2,2'-azobis-2-methylbutylonitrile, benzoyl peroxide, t-alkyl peroxy ester, acetyl peroxide and diisopropyl peroxycarbonate may be mentioned. Further, the above reaction is carried out preferably at from 20 to 200° C., preferably from 50 to 150° C. for from several hours to several tens hours.

The number average molecular weight (Mn) of the polymer (A) in the present invention is preferably from 2,000 to 50,000, particularly preferably from 4,000 to 30,000, with a view to further increasing the rupture stress and the elongation at break of a cured product. Here, in the present invention, the number average molecular weight means a number average molecular weight (Mn) calculated as standard polystyrene measured by means of gel permeation chromatography (GPC) employing tetrahydrofuran as a mobile phase, and the weight average molecular weight means the weight average molecular weight (Mw) by the same GPC measurement as described above. Further, the molecular weight distribution means the weight average molecular weight (Mw)/number average molecular weight (Mn). Further, Mn of the polymer (A) means Mn before curing. When Mn of the polymer (A) is at most 50,000, favorable extrudability will be obtained, and for example, in a case where the curable composition is used as a sealant or an elastic adhesive, favorable workability will be obtained. On the other hand, when Mn of the polymer (A) is at least 2,000, the composition will have favorable curing properties.

Further, as a method of controlling characteristics of the curable composition, a method of adjusting Mw/Mn (molecular weight distribution) of the polymer (A) may be mentioned. Mw/Mn of the polymer (A) may be adjusted by adjusting the type and the amount of the polymerization catalyst used to obtain the polyoxyalkylene chain-containing polymer (P) as its starting material and optimizing polymerization conditions of the cyclic ether. Further, it can be adjusted also by using a mixture of at least two polymers (A).

When emphasis is put on the strength of a cured product of the curable composition, Mw/Mn of the polymer (A) is preferably small, whereby a cured product will have higher elongation at break and will have higher strength at the same level of the elastic modulus. Particularly, the polymer preferably has Mw/Mn of less than 1.6. In comparison between polymers (A) having the same Mn, when Mw/Mn is less than 1.6, as compared with one having Mw/Mn of at least 1.6, a cured product has higher elongation at break and maximum stress since the content of polymer components with a small molecular weight is small, and in addition, the polymer itself has a lower viscosity, and accordingly the curable composition is excellent in handling efficiency. From the same reasons, Mw/Mn is more preferably at most 1.5, furthermore preferably at most 1.4.

The polymer (A) having a small Mw/Mn is preferably obtained by a method of obtaining a polyoxyalkylene chain-containing polymer having a desired Mw/Mn by a method of polymerizing a cyclic ether using a double metal cyanide complex as a catalyst in the presence of an initiator as described above, and modifying its terminal to introduce a reactive silicon group.

On the other hand, when emphasis is put on obtaining a curable composition having favorable workability by reducing slump properties of the curable composition, Mw/Mn of the polymer (A) is preferably at least 1.6.

The polymer (A) is mixed with the after-mentioned component (B) and as the case requires, other components when the curable composition of the present invention is prepared.

Otherwise, when the curable composition of the present invention is prepared, a mixture of the polymer (A) and other polymer may be used. Such other polymer may, for example, be a polymer obtained by polymerizing an unsaturated group-containing monomer, and may be an acrylic polymer (C) described hereinafter. Such a "mixture of the polymer (A) and other polymer" may be a polymer mixture obtained by mixing the polymer (A) and an unsaturated group-containing monomer and polymerizing the unsaturated group-containing monomer in such a state. Such other polymer may be uniformly dispersed in the form of fine particles or may be uniformly dissolved in the polymer (A). Considering the viscosity and workability of the curable composition, other polymer is preferably uniformly dispersed in the form of fine particles.

<Amidine Derivative Salt (B)>

The amidine derivative salt (B) (hereinafter sometimes referred to as a component (B)) to be used in the present invention is a compound represented by the above formula (2).

In the formula (2), $R^2$ is a hydrocarbon group in which the carbon atom at the α-position to the nitrogen atom is a carbon atom having no unsaturated bond, or a hydrogen atom. The number of carbon atoms in the hydrocarbon group as $R^2$ is preferably from 1 to 20, more preferably from 1 to 10 in view of availability and curing properties.

Each of $R^3$ and two $R^4$'s which are independent of one another, is an organic group or a hydrogen atom. The organic group as $R^3$ or $R^4$ is preferably a $C_{1-20}$ hydrocarbon group, more preferably a $C_{1-10}$ hydrocarbon group in view of availability and curing properties.

$R^5$ is a $C_{1-25}$ linear or branched saturated or unsaturated hydrocarbon group, or a hydrogen atom. The number of carbon atoms in the hydrocarbon group as $R^5$ is preferably from 1 to 20, more preferably from 1 to 12. $R^5$ is preferably a hydrogen atom with a view to obtaining favorable curing properties. When $R^5$ is a hydrocarbon group, excellent anti-bleed-out properties will be obtained.

In the formula (2), $R^2$ is a hydrocarbon group in which the carbon atom at the α-position to the nitrogen atom is a carbon atom having no unsaturated bond, or a hydrogen atom. The number of carbon atoms in the hydrocarbon group as $R^2$ is preferably from 1 to 20, more preferably from 1 to 10 in view of availability and curing properties.

Each of $R^3$ and two $R^4$'s which are independent of one another, is an organic group or a hydrogen atom. The organic group as $R^3$ or $R^4$ is preferably a $C_{1-20}$ hydrocarbon group, more preferably a $C_{1-10}$ hydrocarbon group in view of availability and curing properties.

$R^5$ is a $C_{1-25}$ linear or branched saturated or unsaturated hydrocarbon group, or a hydrogen atom. The number of carbon atoms in the hydrocarbon group as $R^5$ is preferably from 1 to 20, more preferably from 1 to 12. $R^5$ is preferably a hydrogen atom with a view to obtaining favorable curing properties. When $R^5$ is a hydrocarbon group, excellent anti-bleed-out properties will be obtained.

In the formula (2), it is preferred that optionally two or more of $R^2$, $R^3$ and two $R^4$'s are bonded to form a cyclic structure. Specifically, the amidine derivative salt (B) represented by the formula (2) has one or both of a cyclic structure in which $R^2$ and one $R^4$ are bonded, and a cyclic structure in which $R^3$ and one $R^4$ are bonded, and it preferably has both.

Particularly, the component (B) is preferably a salt represented by the following formula (2a):

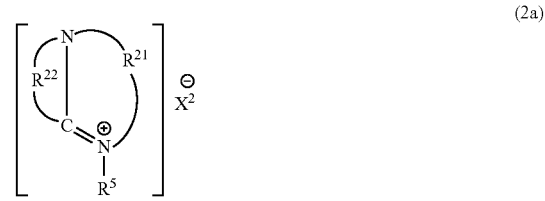

(2a)

In the formula (2a), $R^{21}$ is a bivalent group formed by bonding of $R^1$ and one $R^4$, and is a bivalent hydrocarbon group in which the carbon atom at the α-position to the nitrogen atom is a carbon atom having no unsaturated bond. $R^{21}$ is preferably a $C_{1-10}$ bivalent hydrocarbon group, preferably a $C_{1-6}$ alkylene group.

$R^{22}$ is a bivalent group formed by bonding of $R^3$ and one $R^4$, and is a bivalent organic group. $R^{22}$ is preferably a $C_{1-10}$ bivalent hydrocarbon group, more preferably a $C_{1-6}$ alkylene group.

$R^5$ and $X^2$, and their preferred embodiments, are as defined for the formula (2).

The amidine derivative salt (B) represented by the formula (2a) is preferably, for example, a salt derived from 1,8-diazabicyclo[5.4.0]undec-7-ene (hereinafter referred to as DBU) represented by the following formula (2b) or a salt derived from 1,5-diazabicyclo[4.3.0]non-5-ene (hereinafter referred to as DBN) represented by the following formula (2c).

The amidine derivative salt (B) represented by the formula (2a) may be available as a commercial product. For example, U-CAT SA1 (phenol salt of DBU), U-CAT SA102 (octanoic acid salt of DBU), U-CAT SA106 (oleic acid salt mixture of DBU), U-CAT SA506 (p-toluene sulfonic acid salt of DBU), U-CAT SA603 (formic acid salt of DBU), U-CAT SA1 (phenol salt of DBU) and U-CAT 1102 (octanoic acid salt of DBN) (all are tradenames, manufactured by San-Apro Ltd.), may be mentioned.

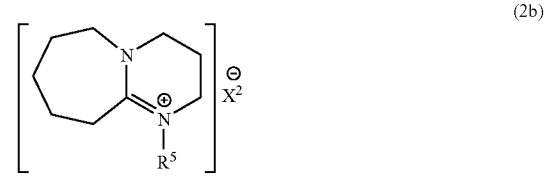

(2b)

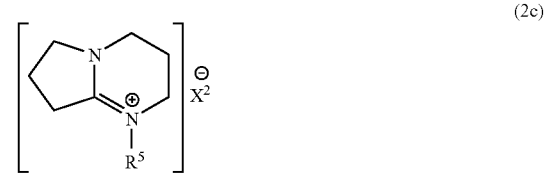

(2c)

In the present invention, the component (B) may be used alone or in combination of two or more.

The amount of use of the component (B) in the curable composition of the present invention is preferably from 0.1 to 10 parts by mass, more preferably from 0.5 to 5 parts by mass per 100 parts by mass of the component (A), or per 100 parts by mass of the total amount of the component (A) and the after-mentioned component (C) in a case where the component (C) is contained. When the amount of use of the component (B) is at least 0.1 part by mass, curing will sufficiently proceed, and if it is at most 10 parts by mass, the strength of a cured product is less likely to be decreased.

In the curable composition of the present invention, the component (B) functions as a curing catalyst. By use of the component (B), the rise of curing at the initial stage after the curable composition is applied is large, and the curable composition will be quickly cured.

The component (B) is a salt of an amidine derivative, and as described in the after-mentioned Examples and Comparative Examples, favorable curing properties will be obtained and the curable composition will be quickly cured as compared with a case where an amidine derivative which is not in the form of a salt is used. Particularly, the rise of curing will be large. Further, the component (B) can make the pH low as compared with an amidine derivative which is not in the form of a salt, whereby handling efficiency can be improved. For example, the pH of DBU is about 13, whereas the pH of the phenol salt of DBU is about 11.5, and the pH of the octanoic acid salt of DBU is about 9.

Further, the component (B) is less likely to undergo bleed out on the surface of a cured product, thus leading to excellent adhesive properties, as compared with an amidine derivative which is not in the form of a salt.

Further, with the component (B), a cured product is less likely to undergo discoloration with time, as compared with an amidine derivative which is not in the form of a salt. Such is preferred for the application to a sealant or an adhesive which requires no discoloration.

<Acrylic Polymer (C)>

The curable composition of the present invention may contain an acrylic polymer (C) (hereinafter sometimes referred to as a component (C)) having a reactive silicon group represented by the following formula (4) and having alkyl (meth)acrylate monomer units:

$$-SiX^{41}{}_bR^{41}{}_{3-b} \quad (4)$$

wherein $R^{41}$ is a $C_{1-20}$ monovalent organic group (excluding a hydrolyzable group) which may have a substituent, $X^{41}$ is a hydroxy group or a hydrolyzable group, and b is an integer of from 1 to 3, provided that when there are a plurality of $R^{41}$'s, the plurality of $R^1$'s may be the same or different, and when there are a plurality of $X^{41}$'s, the plurality of $X^{41}$'s may be the same or different.

The acrylic polymer (C) contains alkyl (meth)acrylate monomer units as an essential component. It may be a polymer containing only alkyl (meth)acrylate monomer units as monomer units or may be a polymer which further contains an unsaturated group-containing monomer in addition. The polymer containing alkyl (meth)acrylate monomer units means a polymer having repeating units derived from an alkyl (meth)acrylate. Such a polymer is usually obtained by polymerizing an unsaturated group-containing monomer containing an alkyl (meth)acrylate monomer as an essential component. In the present invention, the unsaturated group-containing monomer means a compound having an unsaturated bond (preferably a carbon-carbon double bond) and capable of forming a polymer, and the alkyl (meth)acrylate means an alkyl acrylate, an alkyl methacrylate or a mixture of them.

The type and the number of the alkyl (meth)acrylate monomer units contained in the acrylic polymer are not limited.

The acrylic polymer (C) specifically preferably contains an alkyl (meth)acrylate monomer represented by the following formula (11) as monomer units:

$$CH_2=CR^{10}COOR^{11} \quad (11)$$

wherein $R^{10}$ is a hydrogen atom or a methyl group, and $R^{11}$ is an alkyl group which may be substituted by "a hydrocarbon group other than an alkyl group".

$R^{11}$ may be a linear or branched alkyl group, or may be an alkyl group having a cyclic structure such as a cycloalkylalkyl group. Further, $R^{11}$ may be an alkyl group in which at least one hydrogen atom of the alkyl group is substituted by "a hydrocarbon group other than an alkyl group" such as an aryl group.

The acrylic polymer (C) may be one containing one or more of alkyl (meth)acrylate monomers represented by the above formula (11) alone as the monomer units, or may be one which further contains one or more of unsaturated group-containing monomers other that the above monomer as the monomer units. The proportion of the monomer units derived from the alkyl (meth)acrylate monomer represented by the formula (11) is preferably at least 50 mass %, more preferably at least 70 mass % based on the entire acrylic polymer (C).

The acrylic polymer (C) is preferably a polymer (C-1) containing alkyl (meth)acrylate monomer units wherein the alkyl group as $R^{11}$ has from 1 to 8 carbon atoms and alkyl (meth)acrylate monomer units wherein such an alkyl group has at least 10 carbon atoms, or a polymer (C-2) containing alkyl (meth)acrylate monomer units wherein the alkyl group as $R^{11}$ has from 1 to 2 carbon atoms, and alkyl (meth)acrylate monomer units wherein such an alkyl group has from 3 to 10, more preferably from 3 to 6 carbon atoms. Each of the acrylic polymers (C-1) and (C-2) is excellent in compatibility of the acrylic polymer (C) with the polymer (A). Accordingly, by use of the acrylic polymer (C-1) and/or (C-2), characteristics such as mechanical strength of the curable composition after cured will further be improved.

In the polymer (C-1), the alkyl (meth)acrylate monomer wherein the alkyl group has at least 10 carbon atoms is more preferably an alkyl (meth)acrylate monomer wherein the alkyl group has from 10 to 30 carbon atoms, more preferably an alkyl (meth)acrylate monomer wherein the alkyl group has from 10 to 22 carbon atoms.

As specific examples of the alkyl (meth)acrylate monomer, methyl (meth)acrylate, ethyl (meth)acrylate, propyl (meth)acrylate, n-butyl (meth)acrylate, isobutyl (meth)acrylate, tert-butyl (meth)acrylate, n-hexyl (meth)acrylate, n-heptyl (meth)acrylate, isoheptyl (meth)acrylate, n-octyl (meth)acrylate, 2-ethylhexyl (meth)acrylate, isooctyl (meth)acrylate, n-nonyl (meth)acrylate, isononyl (meth)acrylate, cyclohexyl (meth)acrylate, decyl (meth)acrylate, dodecyl (meth)acrylate, tetradecyl (meth)acrylate, hexadecyl (meth)acrylate, ocatadecyl (meth)acrylate, eicosanyl (meth)acrylate, docosanyl (meth)acrylate and hexacosanyl (meth)acrylate may be mentioned.

In the polymer (C-1), the mass ratio of the alkyl (meth)acrylate monomer wherein the alkyl group has from 1 to 8 carbon atoms/the alkyl (meth)acrylate monomer wherein the alkyl group has at least 10 carbon atoms is preferably from 95/5 to 40/60.

In the polymer (C-2), the mass ratio of the alkyl (meth)acrylate monomer wherein the alkyl group has from 1 to 2 carbon atoms/the alkyl (meth)acrylate monomer wherein the alkyl group has from 3 to 10 carbon atoms is preferably from 97/3 to 50/50.

The acrylic polymer (C) may be obtained by copolymerizing, for example, the following acrylic monomer in addition to the alkyl (meth)acrylate monomer represented by the formula (11). That is, the acrylic monomer may, for example, be (meth)acrylic acid, a hydroxyalkyl (meth)acrylate such as hydroxyethyl (meth)acrylate; an isocyanate alkyl (meth)acrylate such as isocyanate ethyl (meth)acrylate; a phenoxyalkyl (meth)acrylate such as 2-phenoxyethyl (meth)acrylate; a (meth)acrylate having a (hydrogenated) furfuryl group such as furfuryl (meth)acrylate or tetrahydrofurfuryl (meth)acrylate; a (meth)acryloyloxy alkylalkoxysilane such as 3-methacryloyloxy propyltrimethoxysilane; or a (meth)acrylate of a polyalkylene oxide monool such as glycidyl (meth)acrylate or methoxypolyethylene glycol (meth)acrylate.

The acrylic polymer (C) may contain monomer units derived from an unsaturated group-containing monomer other than the above. Such an unsaturated group-containing monomer may, for example, be a N-substituted or N,N-substituted (meth)acrylamide such as N,N-dimethylacrylamide; an unsaturated glycidyl ether such as vinyl glycidyl ether, allyl glycidyl ether or methallyl glycidyl ether; a glycidyl ester of an unsaturated monocarboxylic acid such as glycidyl crotonate, glycidyl cinnamate or glycidyl vinyl benzoate; a monoalkyl monoglycidyl ester or diglycidyl ester of an unsaturated dicarboxylic acid; a styrene monomer such as styrene, α-methylstyrene or chlorostyrene; a cycano group-containing monomer such as acrylonitrile or 2,4-dicyanobutene-1; a vinyl ester monomer such as vinyl acetate or vinyl propionate; a diene monomer such as butadiene, isoprene or chloroprene; an olefin; a halogenated olefin; an unsaturated ester; or a vinyl ether.

The acrylic polymer (C) may be obtained by polymerizing the above-described unsaturated group-containing monomer comprising an alkyl (meth)acrylate monomer as an essential component by radical polymerization, anionic polymerization, cationic polymerization or the like. Radical polymerization is particularly preferred, and its manner may be any of solution polymerization, emulsion polymerization, suspension polymerization and bulk polymerization.

In a case where the acrylic polymer (C) is produced by radical polymerization, usually a polymerization initiator as a radical generator is added to the above unsaturated group-containing monomer. The polymerization initiator may be the same one as described for the reaction of the polyoxyalkylene chain-containing polymer having an unsaturated group with the mercapto compound. The polymerization initiator is not necessarily required in a case where activation is carried out by radiation or heat. Further, the reaction is preferably carried out at from 20 to 200° C. (preferably from 50 to 150° C.) for from several hours to several tens hours.

Further, for radical polymerization, for the purpose of controlling the molecular weight, etc., a chain transfer agent may be used.

The chain transfer agent may, for example, be an alkyl mercaptan such as n-dodecyl mercaptan, t-dodecyl mercaptan or n-butyl mercaptan, or an α-methylstyrene dimer.

The acrylic polymer (C) may be preliminarily prepared by the above method such as radical polymerization, which is then mixed with other components to prepare the curable composition. Otherwise, instead of such a method, the unsaturated group-containing monomer may be polymerized in the presence of other component for the curable composition to form the acrylic polymer (C). In such a case, it is preferred to polymerize the unsaturated group-containing monomer in the presence of the polymer (A), whereby a mixing step may be omitted, and further, it will be easy to uniformly disperse the acrylic polymer (C) in the polymer (A). Further, in the polymerization process, part of the unsaturated group-containing monomer may be graft-polymerized to the polymer (A) having a reactive silicon group. In such a case, the graft polymer functions as a compatibilizing agent, and dispersibility of the acrylic polymer (C) will be more improved.

The acrylic polymer (C) has at least one reactive silicon group represented by the above formula (4) at least one of its terminals and side chains. In the above formula (4), $R^{41}$ may be the same one as $R^1$ in the above formula (1), and its preferred embodiment is also the same.

In the above formula (4), $X^{41}$ may be the same one as $X^1$ in the above formula (1), and its preferred embodiment is also the same.

In the above formula (4), b is the same as "a" in the above formula (1), and its preferred embodiment is also the same.

The reactive silicon group in the polymer (A) and the reactive silicon group in the acrylic polymer (C), which coexist in the curable composition of the present invention, may be the same or different.

As a method of introducing the reactive silicon group to the acrylic polymer (C), for example, the following method (i), (ii), (iii) or (iv) may be mentioned. Further, a plurality of methods selected from these methods may be combined.

(i): A method of copolymerizing an unsaturated group-containing monomer having a reactive silicon group represented by the formula (4) when the acrylic polymer (C) is prepared by polymerization of the unsaturated group-containing polymer.

(ii): A method of using a chain transfer agent having a reactive silicon group represented by the formula (4) when the acrylic polymer (C) is prepared by polymerization of the unsaturated group-containing polymer.

(iii): A method of using an initiator having a reactive silicon group represented by the formula (4) when the acrylic polymer (C) is prepared by polymerization of the unsaturated group-containing polymer.

(iv): A method of preparing an acrylic polymer having a functional group such as a hydroxy group, an amino group, a carboxy group, an isocyanate group or an epoxy group, and reacting a compound having a functional group reactive with the above functional group and a reactive silicon group represented by the formula (4) therewith.

The unsaturated group-containing monomer having a reactive silicon group represented by the formula (4), used in the above method (i), is preferably a compound represented by the following formula (12):

$$R^{13}—SiX^{41}{}_bR^{41}{}_{3-b} \qquad (12)$$

In the formula (12), $R^{13}$ is a monovalent organic group having an unsaturated group. In the formula (12), $R^{41}$, $X^{41}$ and b are as defined for the formula (4).

As specific examples of a preferred compound represented by the formula (12), vinylsilanes such as vinylmethyldimethoxysilane, vinylmethyldiethoxysilane, vinylmethyldichlorosilane, vinyltrimethoxysilane, vinyltriethoxysilane, vinyltrichlorosilane and tris(2-methoxyethoxy)vinylsilane; and (meth)acryloyloxysilanes such as 3-acryloyloxypropylmethyldimethoxysilane, 3-methacryloyloxypropylmethyldimethoxysilane, 3-acryloyloxypropyltrimethoxysilane, 3-acryloyloxypropyltriethoxysilane, 3-methacryloyloxypropyltrimethoxysilane and 3-methacryloyloxypropyltriethoxysilane may be mentioned.

In the above method (i), the amount of use of the unsaturated group-containing monomer having a reactive silicon group represented by the formula (4) is preferably from 0.01 to 20 parts by mass per 100 parts by mass of the entire monomers used for preparation of the acrylic polymer (C).

The chain transfer agent having a reactive silicon group represented by the formula (4), used in the above method (ii), is preferably a compound represented by the following formula (13) or a compound represented by the following formula (14):

$$HS—R^{14}—SiX^{41}{}_bR^{41}{}_{3-b} \quad (13)$$

In the formula (13), $R^{14}$ is a single bond or a bivalent organic group. $R^{41}$, and b are as defined for the formula (4).

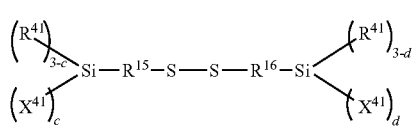

(14)

In the formula (14), $R^{41}$ and $X^{41}$ are as defined for the formula (4). $R^{15}$ and $R^{16}$ are a single bond or a bivalent organic group, and each of c and d which are independent of each other, is an integer of from 1 to 3.

As specific examples of a preferred compound represented by the formula (13), mercapto compounds having a reactive silicon group, such as 3-mercaptopropyltrimethoxysilane, 3-mercaptopropylmethyldimethoxysilane, 3-mercaptopropyltriethoxysilane, 3-mercaptopropylmethyldiethoxysilane and 3-mercaptopropyltriisopropenyloxysilane may be mentioned. As specific examples of a preferred compound represented by the formula (14), $(CH_3O)_3Si$—S—S—$Si(OCH_3)_3$ and $(CH_3O)_3Si$—$(CH_2)_3$—S—S—$(CH_2)_3$—$Si(OCH_3)_3$ may be mentioned.

As the initiator having a reactive silicon group represented by the formula (4), used in the above method (iii), an azo compound having a reactive silicon group may be used.

As an example of the compound having a reactive silicon group represented by the formula (4), used in the above method (iv), a mercapto compound having a reactive silicon group represented by the formula (10) may be used for an alkyl (meth)acrylate copolymer having an isocyanate group.

The number average molecular weight Mn of the acrylic polymer (C) is preferably from 500 to 100,000, more preferably from 1,000 to 100,000. If Mn of the acrylic polymer (C) exceeds 100,000, workability tends to be decreased, and if Mn is less than 500, physical properties after cured tend to be decreased.

It is considered that the reactive silicon group of the acrylic polymer (C) is reacted with the reactive silicon group of the polymer (A) to form a bond when the curable composition is cured, whereby the mechanical strength of a cured product after cured is improved, and weather resistance of the curable composition and a cured product thereof is improved.

Particularly, the acrylic polymer (C) preferably has a reactive silicon group at its terminal, whereby elongation characteristics of the curable composition after cured can be further improved. Such an acrylic polymer (C) having a reactive silicon group at its terminal can be obtained, for example, by the above method (ii) or the above method (iii).

By the curable composition of the present invention containing the acrylic polymer (C), mechanical strength of a cured product after cured will be improved, and weather resistance of the curable composition and a cured product thereof will be more favorable.

In a case where the curable composition of the present invention contains the acrylic polymer (C), its content is preferably from 5 to 70 parts by mass, more preferably from 20 to 60 parts by mass per 100 parts by mass of the total amount of the polymer (A) and the acrylic polymer (C). When the proportion of the content of the acrylic polymer (C) is at least 5 parts by mass, sufficient effects of addition of the component (C) will be obtained, and when it is at most 70 parts by mass, appropriate viscosity of the curable composition will be obtained, thus leading to favorable workability.

<Other Component>

The curable composition may contain, in addition to the above components (A) to (C), as the case requires, the after-mentioned curing accelerator, filler, plasticizer, dehydrating agent, thixotropy-imparting agent, anti-aging agent or adhesion-imparting agent.

Further, the curable composition may contain, in addition to the above, a surface modifier, a solvent, a modulus adjusting agent such as a compound which generates trimethylsilanol by hydrolysis such as phenoxytrimethylsilane, a compound which is cured by the air such as tung oil, a compound which is cured by light such as trimethylolpropane triacrylate, an inorganic pigment such as iron oxide, chromium oxide or titanium oxide, or an organic pigment such as phthalocyanine blue or phthalocyanine green. Use of a pigment is effective for the purpose of not only coloring but also improvement in the weather resistance. Further, a known flame retardant or a fungicide may be added to the curable composition. A delustering agent used for the application to a coating may be added. The curable composition may contain other additives as the case requires, not only the above additives.

(Curing Accelerator)

The curing accelerator may, for example, be a tin compound. The tin compound may, for example, be a bivalent tin compound such as tin 2-ethylhexanoate, tin naphthenate or tin stearate; an organic tin carboxylate such as a dialkyltin dicarboxylate or dialkoxytin monocarboxylate such as dibutyltin dilaurate, dibutyltin diacetate, dibutyltin monoacetate or dibutyltin malate, a tin chelate compound such as dialkyltin bisacetylacetonate or dialkyltin monoacetylacetonate monoalkoxide, a reaction product of a dialkyltin oxide with an ester compound, a reaction product of a dialkyltin oxide with an alkoxysilane compound, or a tetravalent tin compound such as a dialkyltin dialkyl sulfide.

The tin chelate compound may, for example, be dibutyltin bisacetylacetonate, dibutyltin bisethylacetoacetate or dibutyltin monoacetylacetonate monoalkoxide.

The reaction product of a dialkyltin oxide with an ester compound may be a tin compound which is obtained by mixing dibutyltin oxide with a phthalate such as dioctyl phthalate or diisononyl phthalate with heating to react them into a liquid. In such a case, as the ester compound, an ester of an aliphatic or aromatic carboxylic acid other than the phthalate, tetraethyl silicate or its partially hydrolyzed condensate may, for example, be also used. Further, a compound obtained by reacting or mixing such a tin compound with a low molecular alkoxysilane or the like may also be preferably used. In addition to the tin compound, the curing accelerator may, for example, be a bivalent bismuth compound such as a bismuth salt of an organic carboxylic acid; an acidic compound such as phosphoric acid, p-toluene sulfonic acid, phthalic acid or di-2-ethylhexyl phosphate; an amine compound such as an aliphatic monoamine such as butylamine, hexylamine, octylamine, decylamine, laurylamine or N,N-dimethyl-octylamine, an aliphatic polyamine compound such as ethylenediamine, hexamethylenediamine, diethylenetriamine, triethylenetetramine or tetraethylenepentamine, an aromatic amine compound or an alkanolamine, or an organic titanate compound.

The bivalent tin compound or the bivalent bismuth compound is preferably used in combination with a primary amine compound to improve the curing accelerating effects. The curing accelerators may be used alone or in combination of two or more.

The curable composition of the present invention may not substantially contain a curing accelerator, since a favorable curing rate will be obtained even when it contains no curing accelerator. By use of the curing accelerator, the curing rate can be more improved.

When the curing accelerator is used, its amount of use is preferably from 0.1 to 10.0 parts by mass, more preferably from 0.5 to 5 parts by mass per 100 parts by mass of the total amount of the polymer (A) and the acrylic polymer (C).
(Filler)

As specific examples of the filler, calcium carbonate such as heavy calcium carbonate having an average particle size of from 1 to 20 μm, light calcium carbonate having an average particles size of from 1 to 3 μm produced by precipitation method, colloidal calcium carbonate having its surface subjected to surface treatment with a fatty acid or a resin acid type organic substance, and light calcium carbonate; fumed silica; precipitated silica; surface silicone treated silica fine powder; silicic anhydride; hydrous silicic acid; carbon black; magnesium carbonate; diatomaceous earth; calcined clay; clay; talc; titanium oxide; bentonite; ferric oxide; zinc oxide; activated zinc oxide; inorganic hollow bodies such as shirasu balloons, perlite, glass balloons, silica balloons, fly ash balloons, alumina balloons, ziroconia balloons and carbon balloons; organic resin hollow bodies such as phenol resin balloons, epoxy resin balloons, urea resin balloons, polyvinylidene chloride resin balloons, polyvinylidene chloride/acrylic resin balloons, polystyrene balloons, polymethacrylate balloons, polyvinyl alcohol balloons, styrene/acrylic resin balloons and polyacrylonitrile balloons; powdery fillers such as resin beads, wood filler, pulp, cotton chips, mica, walnut shell flour, rice hull flour, graphite, aluminum fine powder and flint powder; and fibrous fillers such as glass fibers, glass filaments, carbon fibers, Kevlar fibers and polyethylene fibers may be mentioned. Such fillers may be used alone or in combination of two or more.

Among them, calcium carbonate is preferred, and it is particularly preferred to use heavy calcium carbonate and colloidal calcium carbonate in combination.

Further, it is preferred to use hollow bodies as a filler in view of weight saving of the curable composition and a cured product thereof. Further, by use of hollow bodies, stickiness of the composition can be reduced, thereby improving the workability. The hollow bodies may be used alone or may be combined with other filler such as calcium carbonate.
(Plasticizer)

The plasticizer may, for example, be a phthalate such as dioctyl phthalate, dibutyl phthalate, butylbenzyl phthalate or isononyl phthalate; an aliphatic carboxylate such as dioctyl adipate, diisodecyl succinate, dibutyl sebacate or butyl oleate; an alcohol ester such as pentaerythritol ester; a phosphate such as trioctyl phosphate or tricresyl phosphate; an epoxy plasticizer such as epoxidized soybean oil, dioctyl-4,5-epoxy-hexahydrophthalate or benzyl epoxystearate; a chlorinated paraffin; a polyester plasticizer such as a polyester obtained by reacting a dibasic acid with a dihydric alcohol; or a polymer plasticizer such as a polyether having a hydroxy group of a polyoxypropylene glycol or its derivative, such as polyoxypropylene glycol, sealed with an alkyl ether, an oligomer of a polystyrene such as poly-α-methylstyrene or polystyrene, or an oligomer such as polybutadiene, a butadiene-acrylonitrile copolymer, polychloroprene, polyisoprene, polybutene, hydrogenated polybutene or epoxidized polybutadiene. Such plasticizers may be used in combination of two or more different types such as a phthalate and an epoxy plasticizer.
(Dehydrating Agent)

To the curable composition, a small amount of a dehydrating agent may be added within a range not to impair the curing properties and flexibility, so as to further improve the storage stability. The dehydrating agent may, for example, an alkyl orthoformate such as methyl orthoformate or ethyl orthoformate, an alkyl orthoacetate such as methyl orthoacetate or ethyl orthoacetate, a hydrolyzable organic silicon compound such as methyltrimethoxysilane, vinyltrimethoxysilane, tetramethoxysilane or tetraethoxysilane, or a hydrolyzable organic titanium compound. Among them, vinyltrimethoxysilane or tetraethoxysilane is particularly preferred in view of the cost and effects. It is effective to use this dehydrating agent particularly when the curable composition is used as a product known as a one pack type in which the curable composition is packed in a moistureproof container in a state where it contains a curing accelerator.
(Thixotropy-imparting Agent)

By incorporating a thixotropy-imparting agent, sagging of the curable composition will be reduced. Such a thixotropy-imparting agent may, for example, be hydrogenated castor oil or a fatty acid amide, which is used in an optional amount.
(Anti-aging Agent)

As the anti-aging agent, a commonly used antioxidant, ultraviolet absorber or light stabilizer may suitably be used. Specifically, a hindered amine, benzotriazole, benzophenone, benzoate, cyanoacrylate, acrylate, hindered phenol, phosphorus or sulfur compound may be suitably used as the anti-aging agent. Particularly, it is preferred to use two or all selected from the group consisting of the light stabilizer, the antioxidant and the ultraviolet absorber in combination, whereby the characteristics of the respective components can be made use of and such use is effective as a whole. Specifically, it is preferred to combine a tertiary or secondary hindered amine light stabilizer, a benzotriazole ultraviolet absorber and a hindered phenol or phosphite antioxidant.
(Adhesion-imparting Agent)

As specific examples of the adhesion-imparting agent, an organic silane coupling agent such as silane having a (meth)acryloyloxy group, silane having an amino group, silane having an epoxy group or silane having a carboxy group; an organic metal coupling agent such as isopropyl tri(N-aminoethyl-aminoethyl)propyltrimethoxytitanate or 3-mercaptopropyltrimethoxytitanate; and an epoxy resin may be mentioned.

As specific examples of the silane having an amino group, 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-ureidopropyltriethoxysilane, N-(N-vinylbenzyl-2-aminoethyl)-3-aminopropyltrimethoxysilane and 3-anilinopropyltrimethoxysilane may be mentioned.

As specific examples of the epoxy resin, a bisphenol A-diglycidyl ether epoxy resin, a bisphenol F-diglycidyl ether epoxy resin, a tetrabromobisphenol A-glycidyl ether epoxy resin, a novolac epoxy resin, a hydrogenated bisphenol A epoxy resin, a glycidyl ether epoxy resin of a bisphenol A propylene oxide adduct, glycidyl 4-glycidyloxybenzoate, diglycidyl phthalate, diglycidyl tetrahydrophthalate, diglycidyl hexahydrophthalate, a diglycidyl ester epoxy resin, a m-aminophenol epoxy resin, a diaminodiphenylmethane epoxy resin, a urethane-modified epoxy resin, N,N-diglycidylaniline, N,N-diglycidyl-o-toluidine, triglycidyl isocyanurate, polyalkylene glycol diglycidyl ether, a glycidyl ether of a polyhydric alcohol (such as glycerol), a hydantoin epoxy resin and an unsaturated polymer (e.g. petroleum resin) epoxy resin may be mentioned.

In a case where the above silane coupling agent is added to the curable composition, its addition amount is preferably from 0.1 to 30 parts by mass per 100 parts by mass of the total amount of the polymer (A) and the acrylic polymer (C).

In a case where the above epoxy resin is added to the curable composition, its addition amount is preferably at most 100 parts by mass, more preferably from 10 to 80 parts by mass per 100 parts by mass of the total amount of the polymer (A) and the acrylic polymer (C).

EXAMPLES

Now, the present invention will be described in further detail with reference to Examples and Comparative Examples. However, it should be understood that the present invention is by no means restricted to such specific Examples.

Preparation Examples

The polymer (A), the amidine derivative salt (B) and the acrylic polymer (C) were produced as follows. In the following Preparation Examples, preparation reaction was carried out by using a pressure reactor equipped with a nitrogen supply pipe and a stirrer, capable of adjusting the internal temperature.

Preparation Example 1

Preparation of Polymer (A1)

Propylene oxide (hereinafter referred to as "PO") was reacted using propylene glycol as an initiator in the presence of zinc hexacyanocobaltate tert-butyl alcohol complex catalyst to obtain a polyoxypropylene diol having a number average molecular weight (Mn) of 15,000 and a molecular weight distribution (Mw/Mn) of 1.2. To this polyoxypropylene diol, a methanol solution containing sodium methoxide in an amount of 1.05 mol per 1 mol of hydroxy groups in the polyoxypropylene diol was added. The mixture was heated at 130° C. under reduced pressure to distil methanol off, thereby to convert hydroxy groups in the polyoxypropylene diol to sodium alkoxide, and then allyl chloride in an amount of 1.05 times by mol of added sodium methoxide was added, followed by reaction. Unreacted allyl chloride was removed, and then inorganic salts formed as by-products were removed to obtain an oxypropylene polymer having an allyl group at its terminal and having a viscosity of 10.0 Pa·s (25° C.).

Further, this oxypropylene polymer having an allyl group at its terminal was reacted with methyldimethoxysilane in the presence of a platinum catalyst, and then 500 ppm of dibutyl hydroxytoluene was added and dissolved, to obtain an oxypropylene polymer (A) (hereinafter referred to as "polymer (A1)" having 75 mol % of allyl groups converted to methyldimethoxysilyl group terminal.

The obtained polymer (A1) had a viscosity of 12.0 Pa·s (25° C.), a Mn of 15,000 and Mw/Mn of 1.2.

Preparation Example 2

Preparation of Polymer (A2)

Propylene oxide (hereinafter referred to as "PO") was reacted using polyoxypropylene triol (Mn: 1,000) as an initiator in the presence of a zinc hexacyanocobaltate-glyme complex catalyst to obtain a polyoxypropylene triol having Mn of 17,000 and Mw/Mn of 1.4.

Using the obtained polyoxypropylene triol, an oxypropylene polymer having an allyl group at its terminal and having a viscosity of 7.0 Pa·s (25° C.) was obtained in the same manner as in Preparation Example 1.

Further, this oxypropylene polymer having an allyl group at its terminal was reacted with methyldimethoxysilane in the presence of a platinum catalyst to obtain an oxypropylene polymer (A) (hereinafter referred to as "polymer (A2)") having a methyldimethoxysilyl group at its terminal.

The obtained polymer (A2) had a viscosity of 9.0 Pa·s (25° C.), Mn of 17,000 and Mw/Mn of 1.4.

Preparation Example 3

Preparation of Polymer (A3)

In this Examples, the polymer (A) was prepared by a method of subjecting a polymer (pP) having a polyoxyalkylene chain and a hydroxy group to urethane-forming reaction with an isocyanate compound (U).

PO was subjected to ring-opening polymerization to polyoxypropylene diol (Mn: 1,000) in the presence of a zinc hexacyanocobaltate-glyme complex catalyst to obtain a polyoxyalkylene diol (Mn: 16,000, hydroxy value: 7.7) (polymer (P-1)). 3,000 g of the polymer (P-1) was put in a pressure reactor (internal volume: 5 L) and dehydrated under reduced pressure for 5 hours so that the moisture content became at most 50 ppm while the internal temperature was maintained at 110° C. The moisture content after dehydration under reduced pressure was 15 ppm. Then, the air inside the reactor was replaced with nitrogen gas, and 86.1 g of 3-isocyanate propyltrimethoxysiiane (purity: 95%) was added to adjust NCO/OH to be 0.97, while the internal temperature was maintained at 50° C. Then, while the internal temperature was maintained at 80° C. for 8 hours, the polymer (P-1) and 3-isocyanate propyltrimethoxysilane were subjected to urethane-forming reaction to obtain an oxypropylene polymer (hereinafter referred to as a "polymer (A3)") having a trimethoxysilyl group at its terminal.

The obtained polymer (A3) had a viscosity of 20.0 Pa·s (25° C.), Mn of 17,000 and Mw/Mn of 1.38.

Preparation Example 4

Preparation of Polymer (A4)

TDI used in this Example is tolylene diisocyanate, and "TDI-80" means a mixture of 2,4-TDI/2,6-TDI=80/20 (mass ratio). Further, 2EHA means 2-ethylhexyl acrylate, and KBM602 (tradename, manufactured by Shin-Etsu Chemical Co., Ltd.) means N-2(aminoethyl)3-aminopropylmethyldimethoxysilane.

First, using polyoxypropylene triol (Mw: 1,000) as an initiator in the presence of a zinc hexacyanocobaltate-t-butyl alcohol complex catalyst, PO was reacted to obtain a polyoxypropylene triol (polymer (P-2)) having a number average molecular weight (Mn) of 10,000 and a molecular weight distribution (Mw/Mn) of 1.2.

Then, 2,000 g of the above obtained polymer (P-2) was charged in a 3,000 ml pressure reactor, heated to 110° C. and vacuum dehydrated. Then, the air in the reactor was replaced with nitrogen, the temperature was decreased to 80° C., and 104.4 g of TDI-80 (tradename, manufactured by Nippon Polyurethane Industry Co., Ltd.) and 1 g of dibutyltin dilaurate (DBTDL) were charged, followed by reaction for 7 hours. A NCO content of 1.18 was confirmed by a titration method, followed by cooling to room temperature, thereby to obtain a prepolymer.

The obtained prepolymer had Mn of 20,000 and Mw/Mn of 1.6. The molar ratio (isocyanate groups/hydroxy groups) of the total number of isocyanate groups of TDI to the total number of hydroxy groups of the polymer (P-2) used was 2.

Then, the above prepolymer was cooled to 50° C., and 25 parts by mass of a mixture obtained by mixing 2EHA and KBM602 in a ratio (parts by mass) of 2EHA:KBM602=184: 206, stored at 60° C. for 5 days, was charged, followed by reaction in a nitrogen atmosphere at 50° C. for 1 hour. Disappearance of the peak of isocyanate was confirmed by FT-IR, followed by cooling to room temperature, thereby to obtain an oxypropylene polymer (hereinafter referred to as "polymer (A4)") having a methyldimethoxysilyl group at its terminal. The obtained polymer (A4) had Mn of 21,000 and Mw/Mn of 1.7.

Preparation Example 5

Preparation of Polymer Mixture (A1/C1)

In this example, a polymer mixture (A1/C1) containing the polymer (A1) and the acrylic polymer (C1) was prepared by a method of polymerizing an unsaturated group-containing monomer constituting the acrylic polymer (C) in the presence of the polymer (A1) obtained in Preparation Example 1.

140 g of the polymer (A1) was put in a pressure reactor equipped with a stirrer, and the temperature was raised to about 67° C. While the temperature in the reactor was kept at about 67° C., in a nitrogen atmosphere, a mixed solution of a predetermined amount of a monomer selected from 72 g of methyl methacrylate, 6.5 g of n-butyl acrylate, 29.0 g of n-butyl methacrylate, 15.0 g of 3-methacryloyloxypropyltriethoxysilane and 14.0 g of n-dodecyl mercaptan, and 2.5 g of 2,2'-azobis(2,4-dimethylvaleronitrile) (tradename: V65, manufactured by Wako Pure Chemical Industries, Ltd.) was dropwise added to the above polymer (A1) with stirring over a period of 8 hours to carry out polymerization, to prepare a (meth)acrylate copolymer (hereinafter referred to as "acrylic polymer (C1)") having a triethoxysilyl group as a reactive silicon group in the presence of the polymer (A1). The obtained "polymer mixture (A1/C1) containing the polymer (A1) and the acrylic polymer (C1)" was dissolved in hexane, subjected to centrifugal separation and extraction, and then the number average molecular weight (Mn) of the acrylic polymer (C1) was measured, whereupon it was 4,000.

Comparative Preparation Example 1

Preparation of Quaternary Ammonium Salt (B4) Having No Amidine Structure

To a rotating autoclave, didecylmethylamine (1 mol), dimethyl carbonate (1.5 mols) and methanol (2.0 mols) as a solvent were charged and reacted at a reaction temperature of 110° C. for 12 hours to obtain a methanol solution of N-dimethyldidecylammonium methyl carbonate, to which octylic acid (1 mol) was charged, and carbon dioxide gas formed as a by-product and methanol were removed to obtain dimethyldidecylammonium/octanoic acid salt (quaternary ammonium salt (B4)).

Examples 1 to 11 and Comparative Examples 1 to 7

Curable compositions were prepared in proportions as identified in Tables 1 and 2 using the respective components prepared in the above Preparation Examples and the following commercially available components, and their characteristics were evaluated. The units of the proportions in Tables are "part(s) by mass" (the same applies hereinafter).
<Amidine Derivative Salt (B)>
   (B1): U-CAT SA-1 (tradename), DBU/phenol salt, manufactured by San-Apro Ltd.
   (B2): U-CAT SA-102 (tradename), DBU/octanoic acid salt, manufactured by San-Apro Ltd.
   (B3): U-CAT 1102 (tradename), DBN/octanoic acid salt, manufactured by San-Apro Ltd.
<Filler>
   HAKUENKA CCR (tradename), surface treated calcium carbonate, manufactured by Shiraishi Kogyo Kaisha, Ltd.
   WHITON SB (tradename), heavy calcium carbonate, manufactured by SHIRAISHI CALCIUM KAISHA, LTD.
<Plasticizer>
   DOP (dioctyl phthalate)
<Thixotropy-imparting Agent>
   DISPARLON 6500 (tradename), hydrogenated castor oil, manufactured by Kusumoto Chemicals Ltd.
<Dehydrating Agent>
   KBM-1003 (tradename), vinyltrimethoxysilane, manufactured by Shin-Etsu Chemical Co., Ltd.
<Adhesion-imparting Agent>
   KBM603 (tradename), N-aminoethyl-3-aminopropyltrimethoxysilane, manufactured by Shin-Etsu Chemical Co., Ltd.
   KBM-403 (tradename), 3-glycidyloxypropyltrimethoxysilane, manufactured by Shin-Etsu Chemical Co., Ltd.
<Curing Catalyst in Comparative Examples>
   Organic bismuth catalyst: bismuth octanoate
   Organotin catalyst: EXCESTAR C10 (tradename), dibutyltin monoacetate, manufactured by Asahi Glass Company, Limited Examples 1 to 10

A one pack type curable composition was prepared in a proportion as identified in Table 1 or 2 by using each of the polymers (A1 to A4) and (A1/C1) and each of the amidine derivative salts (B1 to 3). The proportion of the polymer mixture (A1/C1) in Tables 1 and 2 is the total amount of the polymer (A1) and the acrylic polymer (C1).

First, to the polymer, a filler, a plasticizer and a thixotropy-imparting agent were added, and stirred by a planetary stirring machine (manufactured by KURABO INDUSTRIES LTD.). The temperature of the mixture was decreased to room temperature, and the mixture was made into a further uniform mixture by three rolls.

Then, a dehydrating agent and an adhesion-imparting agent were added, followed by stirring. Then, the amidine derivative salt (B1 to 3) as a curing catalyst was added, followed by stirring to obtain a curable composition.

Example 11

A two pack type curable composition comprising a main agent and a curing agent was produced. A mixture of the polymer (A1), a filler, a thixotropy-imparting agent, a dehydrating agent and an adhesion-imparting agent was prepared to obtain a main agent. Separately, a mixture of a plasticizer and the amidine derivative salt (B2) was prepared to obtain a curing agent.

Comparative Examples 1 to 7

A curable composition was prepared in the same manner as in Example 1 except that instead of the amidine derivative salt (B1 to 3), the quaternary ammonium salt (B4), an organic bismuth catalyst or an organotin catalyst was used in a composition as identified in Table 1 or 2.

[Evaluation]

A coating film was formed by using each of the curable compositions obtained in Examples. With respect to the two pack type curable composition, it was stored at room temperature (23° C.) for 4 weeks after its preparation, and the main agent and the curing agent were mixed at the time of use to form a coating film.

Each curable composition was applied on a substrate made of polypropylene in a thickness of 5 mm and cured in an environment at 23° C. under a humidity of 50%. The time immediately after application until the polymer did not stick to a finger which had lightly attached to the surface, was measured as a surface coating film forming time. The results are shown in Tables 1 and 2. A shorter surface coating film forming time means a higher curing rate. Further, in Tables 1 and 2, presence or absence of the organotin contained is also shown.

Further, the zinc hexacyanocobaltate complex catalyst used for preparation of the polymer (A) does not substantially influence curing properties since its addition amount is at a level of 200 ppm (1.6 ppm as a metal amount) and is extremely small.

TABLE 1

|  |  | Examples | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Curable resin component | Polymer (A1) | 100 | 100 |  |  |  |  |  |  |  |  | 100 |
|  | Polymer (A2) |  |  | 100 | 100 |  |  |  |  |  |  |  |
|  | Polymer (A3) |  |  |  |  | 100 | 100 | 100 |  |  |  |  |
|  | Polymer (A4) |  |  |  |  |  |  |  | 100 | 100 |  |  |
|  | Polymer mixture (A1/C1) |  |  |  |  |  |  |  |  |  | 100# |  |
| Filler | HAKUENKA CCR | 50 | 50 | 50 | 50 | 50 | 50 | 50 | 50 | 50 | 50 | 50 |
|  | WHITON SB | 30 | 30 | 30 | 30 | 30 | 30 | 30 | 30 | 30 | 30 | 30 |
| Plasticizer | DOP | 20 | 20 | 20 | 20 | 20 | 20 | 20 | 20 | 20 | 20 | 20 |
| Thixotropy-imparting agent | DISPARLON 6500 | 3 | 3 | 3 | 3 | 3 | 3 | 3 | 3 | 3 | 3 | 3 |
| Dehydrating agent | KBM-1003 | 5 | 3 | 3 | 3 | 3 | 3 | 3 | 3 | 3 | 3 | 3 |
| Adhesion-imparting agent | KBM-603 | 3 | 3 | 3 | 3 | 3 | 3 | 3 | 3 | 3 | 3 | 3 |
|  | KBM-403 | 1 | 1 | 1 | 1 | 1 | 1 | 1 | 1 | 1 | 1 | 1 |
| Curing catalyst | Amidine derivative salt (B1) | 2 |  | 2 |  | 2 |  |  | 2 |  |  |  |
|  | Amidine derivative salt (B2) |  | 2 |  | 2 |  | 2 |  |  | 2 | 2 | 2 |
|  | Amidine derivative salt (B3) |  |  |  |  |  |  | 2 |  |  |  |  |
|  | Quaternary salt (B4) |  |  |  |  |  |  |  |  |  |  |  |
|  | Organic bismuth catalyst |  |  |  |  |  |  |  |  |  |  |  |
|  | Organotin catalyst |  |  |  |  |  |  |  |  |  |  |  |
| Surface coating film forming time (23° C., 50%) |  | 40 min | 40 min | 30 min | 30 min | 20 min | 20 min | 30 min | 30 min | 30 min | 40 min | 40 min |
| Organotin |  | Nil | Nil | Nil | Nil | Nil | Nil | Nil | Nil | Nil | Nil | Nil |
| Type of curable composition |  | One pack type | One pack type | One pack type | One pack type | One pack type | One pack type | One pack type | One pack type | One pack type | One pack type | Two pack type |

TABLE 2

|  |  | Comparative Examples | | | | | | |
|---|---|---|---|---|---|---|---|---|
|  |  | 1 | 2 | 3 | 4 | 5 | 6 | 7 |
| Curable resin component | Polymer (A1) | 100 |  |  |  |  | 100 |  |
|  | Polymer (A2) |  | 100 |  |  |  |  |  |
|  | Polymer (A3) |  |  | 100 |  | 100 |  | 100 |
|  | Polymer (A4) |  |  |  | 100 |  |  |  |
|  | Polymer mixture (A1/C1) |  |  |  |  |  |  |  |
| Filler | HAKUENKA CCR | 50 | 50 | 50 | 50 | 50 | 50 | 50 |
|  | WHITON SB | 30 | 30 | 30 | 30 | 30 | 30 | 30 |
| Plasticizer | DOP | 20 | 20 | 20 | 20 | 20 | 20 | 20 |
| Thixotropy-imparting agent | DISPARLON 6500 | 3 | 3 | 3 | 3 | 3 | 3 | 3 |
| Dehydrating agent | KBM-1003 | 3 | 3 | 3 | 3 | 3 | 3 | 3 |
| Adhesion-imparting agent | KBM-603 | 3 | 3 | 3 | 3 | 3 | 3 | 3 |
|  | KBM-403 | 1 | 1 | 1 | 1 | 1 | 1 | 1 |
| Curing catalyst | Amidine derivative salt (B1) |  |  |  |  |  |  |  |
|  | Amidine derivative salt (B2) |  |  |  |  |  |  |  |
|  | Amidine derivative salt (B3) |  |  |  |  |  |  |  |
|  | Quaternary salt (B4) | 2 | 2 | 2 | 2 |  |  |  |
|  | Organic bismuth catalyst |  |  |  |  | 2 |  |  |
|  | Organotin catalyst |  |  |  |  |  | 2 | 2 |
| Surface coating film forming time (23° C., 50%) |  | 120 min | 100 min | 60 min | 90 min | 5 hrs | 60 min | 5 min |

TABLE 2-continued

|  | Comparative Examples | | | | | | |
| --- | --- | --- | --- | --- | --- | --- | --- |
|  | 1 | 2 | 3 | 4 | 5 | 6 | 7 |
| Organotin | Nil | Nil | Nil | Nil | Nil | Contained | Contained |
| Type of curable composition | One pack type | One pack type | One pack type | One pack type | One pack type | One pack type | One pack type |

As evident from results in Tables 1 and 2, in Examples 1 to 11 in which the amidine derivative salt (B1-B3) according to the present invention was used as a curing catalyst, the surface coating film forming time is short and the curing rate is high as compared with Comparative Examples 1 to 4 in which the quaternary ammonium salt (B4) which does not satisfy the above formula (2) was used.

In Comparative Example 5 in which the organic bismuth catalyst was used as a curing catalyst, the curing rate is very low.

In Comparative Examples 6 and 7 in which the organotin catalyst was used, curing was quick in Comparative Example 7 in which the polymer (A3) had a urethane bond, but in Comparative Example 6 in which the polymer (A1) having no urethane bond was used, the curing was slow, and curing was slow as compared with Example 2 in which the composition other than the curing catalyst was the same.

Example 12 and Comparative Example 8

The difference in the effects between a case (Example 12) where a salt of DBU was used as a curing catalyst and a case (Comparative Example 8) where DBU which was not in the form of a salt was used. That is, curable compositions were prepared in proportions as identified in Table 3, and their characteristics were evaluated.

Example 12

0.1 part by mass of water, 20 parts by mass of DOP and 10 parts by mass of WHITON SB were added to 30 parts by mass of the polymer (A3) obtained in Preparation Example 3 and uniformly mixed, and then 0.6 part by mass of the amidine derivative salt (B2) was added, followed by uniform stirring and mixing to prepare a curable composition.

Comparative Example 8

A curable composition was prepared in the same manner as in Example 12 except that DBU (manufactured by San-Apro Ltd., tradename: DBU) was used instead of the amidine derivative salt (B2).

[Evaluation]
(Measurement of Hardness)

Each of the curable compositions obtained in Example 12 and Comparative Example 8 was cast into a frame (thickness: 12 mm), bubbles on the surface of the composition were removed by spraying nitrogen, and then the curable composition was cured in a thermostatic chamber at 100° C. for 30 minutes to obtain a cured product "a", and the same curable composition was cast and cured in a thermostatic chamber at 100° C. for one hour in the same manner, and then cured in a thermostatic chamber at 50° C. under 65 RH % for 3 days so that it was completely cured to obtain a final cured product b, and the respective cured products were cooled to room temperature (25° C.) and their hardnesses were measured. The hardness was measured by a method of measuring hardness at 5 positions using a digital hardness meter model DD2-C (manufactured by KOBUNSHI KEIKI CO., LTD.) and calculating the average. The results of measuring the final hardness are shown in Table 3.

Further, the ratio (initial curing ratio) of the hardness (initial hardness) of the cured product "a" to the hardness (final hardness) of the final cured product b was calculated. The results are shown in Table 3. A higher value of the initial curing ratio means a higher initial curing rate and a greater rise of curing.

(Bleed Out State on the Surface of Cured Product)

The surface of the above final cured product b was visually observed and tested for bleed out of a liquid material immediately after curing. Then, the final cured product b was left to stand in an atmosphere at 23° C. for 7 days and then tested for bleed out of the liquid material. The results are shown in Table 3 on the basis of the standards: "Nil": no bleed out observed, and "bleed out": bleed out of a liquid material observed.

(Color of Cured Product)

The surface of the above final cured product b was visually observed to check the color immediately after curing. Then, the final cured product b was left to stand in an atmosphere at 23° C. for 7 days and then the color of its surface was checked. The results are shown in Table 3 based on standards: "white": the surface of the cured product was white, and "yellow": the surface of the cured product was yellow.

TABLE 3

|  |  | Ex. 12 | Comp. Ex. 8 |
| --- | --- | --- | --- |
| Curable resin component | Polymer (A3) | 30 | 30 |
| Curing catalyst | Amidine derivative salt (B2) | 0.6 | — |
|  | DBU | — | 0.6 |
| Filler | WHITON SB | 10 | 10 |
| Plasticizer | DOP | 20 | 20 |
| Deionized water | $H_2O$ | 0.1 | 0.1 |
| Hardness | Initial curing ratio (%) | 99% | 90% |
|  | Final hardness | 56 | 55 |
| Color of the surface of cured product | Immediately after curing | White | White |
|  | After left at 23° C. for 7 days | White | Yellow |

TABLE 3-continued

|  |  | Ex. 12 | Comp. Ex. 8 |
|---|---|---|---|
| Bleed out state on the surface of cured product | Immediately after curing | Nil | Nil |
|  | After left at 23° C. for 7 days | Nil | Bleed out |

As shown in Table 3, it is found that the curable composition in Example 12 exhibits a high curing rate at the initial stage and a great rise of curing as compared with Comparative Example 8.

Further, it is found that with respect to the curable composition in Example 12, bleed out and discoloration in a cured product thereof are suppressed as compared with Comparative Example 8.

Industrial Applicability

According to the present invention, a curable composition comprising a polymer having a reactive silicon group as a curing component, containing no or substantially no expensive organic metal compound for which strict control over discharge and disposal is required, and having a high curing rate, can be obtained, such being very useful.

The entire disclosure of Japanese Patent Application No. 2008-041184 filed on Feb. 22, 2008 including specification, claims and summary is incorporated herein by reference in its entirety.

What is claimed is:

1. A curable composition, which comprises a polymer (A) having a polyoxyalkylene main chain and a reactive silicon group represented by the following formula (1) and an amidine derivative salt (B) represented by the following formula (2):

wherein $R^1$ is a $C_{1-20}$ monovalent organic group (excluding a hydrolyzable group) which may have a substituent, $X^1$ is a hydroxy group or a hydrolyzable group, and "a" is an integer of from 1 to 3, provided that when there are a plurality of $R^1$'s, the plurality of $R^1$'s may be the same or different, and when there are a plurality of $X^1$'s, the plurality of $X^1$'s may be the same or different,

wherein $R^2$ is a hydrocarbon group in which the carbon atom at the α-position to the nitrogen atom is a carbon atom having no unsaturated bond, or a hydrogen atom, each of $R^3$ and two $R^4$'s which are independent of one another, is an organic group or a hydrogen atom, $R^5$ is a $C_{1-25}$ linear or branched saturated or unsaturated hydrocarbon group or a hydrogen atom, and $X^2$ is an organic acid ion, an inorganic acid ion or a hydroxy group, and optional two or more of $R^2$, $R^3$ and two $R^4$'s may be bonded to form a cyclic structure, wherein (B) is a p-toluene sulfonic acid salt or a formic acid salt.

2. The curable composition according to claim 1, wherein the polymer (A) has a reactive silicon group represented by the formula (1) and has a urethane bond in its molecule.

3. The curable composition according to claim 1, wherein the polymer (A) is a polymer obtained by subjecting a polymer (pP) having a polyoxyalkylene chain and a hydroxy group to urethane-forming reaction with an isocyanate compound (U) having a group represented by the following formula (3) and an isocyanate group, the ratio (isocyanate groups/hydroxy groups) of the total number of the isocyanate groups of the isocyanate compound (U) to the total number of the hydroxy groups of the polymer (pP) in the urethane-forming reaction being from 0.80 to 1.10:

wherein $R^1$ is a $C_{1-20}$ monovalent organic group (excluding a hydrolyzable group) which may have a substituent, $X^1$ is a hydroxy group or a hydrolyzable group, and "a" is an integer of from 1 to 3, provided that when there are a plurality of $R^1$'s, the plurality of $R^1$'s may be the same or different, and when there are a plurality of $X^1$'s, the plurality of $X^1$'s may be the same or different.

4. The curable composition according to claim 1, which comprises 100 parts by mass of the polymer (A) and from 0.1 to 10 parts by mass of the amidine derivative salt (B).

5. The curable composition according to claim 1, which further contains an acrylic polymer (C) having a reactive silicon group represented by the following formula (4) and having alkyl (meth)acrylate monomer units:

wherein $R^{41}$ is a $C_{1-20}$ monovalent organic group (excluding a hydrolyzable group) which may have a substituent, $X^{41}$ is a hydroxy group or a hydrolyzable group, and b is an integer of from 1 to 3, provided that when there are a plurality of $R^{41}$'s, the plurality of $R^1$'s may be the same or different, and when there are a plurality of $X^{41}$'s, the plurality of $X^{41}$'s may be the same or different.

6. The curable composition according to claim 5, which comprises from 0.1 to 10 parts by mass of the amidine derivative salt (B) per 100 parts by mass of the total amount of the polymer (A) and the acrylic polymer (C).

7. The curable composition according to claim 1, wherein the polymer (A) having a reactive silicon group has a number average molecular weight of from 2,000 to 50,000.

8. The curable composition according to claim 1, wherein (B) is a p-toluene sulfonic acid salt.

9. The curable composition according to claim 1, wherein (B) is a formic acid salt.

* * * * *